US009550082B2

(12) United States Patent
Britton (10) Patent No.: US 9,550,082 B2
(45) Date of Patent: Jan. 24, 2017

(54) FORCIBLE ENTRY TRAINING DEVICE

(71) Applicant: PEB Enterprises, LLC, White Marsh, VA (US)

(72) Inventor: Phillip E. Britton, White Marsh, VA (US)

( * ) Notice: Subject to any disclaimer, the term of this patent is extended or adjusted under 35 U.S.C. 154(b) by 398 days.

(21) Appl. No.: 14/164,528

(22) Filed: Jan. 27, 2014

(65) Prior Publication Data
US 2015/0037767 A1    Feb. 5, 2015

Related U.S. Application Data

(60) Provisional application No. 61/861,747, filed on Aug. 2, 2013.

(51) Int. Cl.
| | | |
|---|---|---|
| *G09B 19/00* | (2006.01) | |
| *A62C 99/00* | (2010.01) | |
| *G09B 19/24* | (2006.01) | |
| *A62B 3/00* | (2006.01) | |

(52) U.S. Cl.
CPC ........... *A62C 99/0081* (2013.01); *G09B 19/00* (2013.01); *G09B 19/003* (2013.01); *G09B 19/24* (2013.01); *A62B 3/005* (2013.01)

(58) Field of Classification Search
USPC .......... 434/219, 226, 247, 258; 49/381, 394, 49/504; 292/219, 240, 241, 261
See application file for complete search history.

(56) References Cited

U.S. PATENT DOCUMENTS

| | | | | |
|---|---|---|---|---|
| 5,906,493 A * | 5/1999 | Bishop | .................... | G09B 9/00 292/357 |
| 6,877,988 B2 * | 4/2005 | Phillips | .................. | G09B 19/00 434/219 |
| 7,789,666 B2 * | 9/2010 | Sovine | .................... | G09B 9/003 434/226 |
| 7,967,326 B2 * | 6/2011 | Klementowicz, III | .................... G09B 19/00 280/656 |
| 7,972,139 B2 * | 7/2011 | Staub | .................. | E05B 17/0058 434/226 |
| 8,167,621 B2 * | 5/2012 | Allen | .................... | G09B 19/00 109/23 |
| 8,197,257 B2 * | 6/2012 | Clewis | .................... | A62B 5/00 434/226 |
| 8,360,782 B1 * | 1/2013 | Temple | .................. | G09B 19/00 434/226 |
| 8,408,917 B2 * | 4/2013 | Perrone | ................ | G09B 19/003 434/226 |

(Continued)

*Primary Examiner* — Kurt Fernstrom
(74) *Attorney, Agent, or Firm* — Duncan G. Byers; Pender & Coward, PC (57) ABSTRACT

A forcible entry training simulator. The simulator has a clamping structure that allows for hinges to be affixed and cut by a trainee in the same manner as would have to be accomplished for forcible entry into a building. The simulator has plunge-cutting and lock-pulling simulators as well. In addition, the simulator has a stabilizing wheel structure utilized to allow easy transport and handling of the simulator.
The structure of the simulator allows low cost alternatives to materials to be used to provide the same level of training as though actual hinges, doors, and locks were being utilized, but without the significant expense of utilizing actual real-world materials in training where the materials will, of necessity, be destroyed.

9 Claims, 12 Drawing Sheets

(56) References Cited

U.S. PATENT DOCUMENTS

| | | | | |
|---|---|---|---|---|
| 8,435,039 B2* | 5/2013 | Paganini | ............ | A62C 99/0081 |
| | | | | 434/226 |
| 8,439,685 B2* | 5/2013 | Shelley | .............. | A62C 99/0081 |
| | | | | 434/226 |
| 8,485,825 B2* | 7/2013 | Walker | ................... | G09B 19/00 |
| | | | | 434/226 |
| 8,556,629 B2* | 10/2013 | Walker | ..................... | G09B 9/00 |
| | | | | 434/226 |
| 8,720,117 B2* | 5/2014 | Phillips | ..................... | F42B 8/00 |
| | | | | 434/226 |
| 8,845,333 B2* | 9/2014 | Perrone | .................. | G09B 25/00 |
| | | | | 434/226 |
| 9,181,735 B2* | 11/2015 | Troxell | ............... | E05B 17/0062 |
| 9,318,028 B1* | 4/2016 | Ingesson | ................. | G09B 9/00 |
| 2005/0050816 A1* | 3/2005 | Manning | ................ | G09B 19/00 |
| | | | | 52/213 |
| 2011/0143324 A1* | 6/2011 | Paganini | ............ | A62C 99/0081 |
| | | | | 434/226 |

* cited by examiner

FORCIBLE ENTRY TRAINING DEVICE

This application claims the benefit of U.S. Provisional Patent Application 61/861,747, filed on Aug. 2, 2013.

FIELD OF THE INVENTION

The invention described herein relates to forcible entry training equipment. More particularly, the invention disclosed is a new design for a reusable forcible entry training device.

BACKGROUND OF THE INVENTION

Fire, rescue, police, and military personnel are required to make forcible entry in many circumstances. It is necessary to practice the skills required for entry into buildings, including the use of tools that are utilized for and/or are specifically designed for forcible entry. However, the nature of forcible entry is such that it requires the destruction of part or all of the structure through which entry is sought. Various methods require the destruction of locks, door panels, windows, hinges, frames, and other associated structural members.

Traditionally, forcible entry training simulations have been accomplished using abandoned and other structures when and if they become available. In the alternative or in addition to utilized abandoned structures for training, doorway and window mock-ups have been built so that the skills could be practiced and the destroyed portion of the structure replaced.

However, abandoned structures are not a reliable source of training for the simple fact that the ability to train is restricted by the available of such structures. Further, abandoned structures often will not provide a trainee with a full set of possible forcible entry scenarios. For example, and abandoned house may provide an opportunity to practice using lock-pulling techniques, but will not provide the opportunity to train with tools and techniques for opening metal doors in commercial buildings.

In addition, existing training devices and mock-ups universally have the same flaws: they utilize expensive hardware that must be replaced after each training exercise. Locks must be bought and re-installed, hinges must be replaced with new, uncut hinges, metal door panels must be changed, door frames must be repaired and or replaced, etc.

What is needed is a device that allows for real-world training exercises in forcible entry that provide a trainee with exactly the look, feel, and performance of specific tasks and utilizing specific tools, the in real scenarios will result in the destruction of some or all of a building's entranceway, window, or door, but that will be reusable at low cost and without destroying expensive hardware structures.

SUMMARY OF THE INVENTION

The present invention is related to forcible entry training devices for fire, rescue, police, para-military and military training. In particular, the present invention provides a novel device for simulating the structure of door hinges that allows a trainee to practice the exact skills, including tool usage, that the trainee will utilize in a real world scenario to cut and remove hinge structures in doorways and windows to allow access to a structure. The invention provides a cost-effective device for repeated training evolutions without costly and time-consuming replacement of expensive hardware and/or door structures.

The present invention provides for a realistic and reusable training device that gives fire, rescue, police, and other emergency responders training on:
   Hinge cutting;
   Lock pulling/breaking; and
   Window and solid door entry techniques.

The invention further provides for a device that, although solid, stable, and useful for innumerable training cycles, is also portable and may be maneuvered on flat surfaces by a single individual by use of a unique third-wheel dolly system in which the third-wheel is retractable and allows the device to be used with the third-wheel conveniently located out of harm's way.

When cutting hinges for entry through a locked door, the exposed portion of the hinges provides a unique challenge in that the only portion of the hinge that is visible and accessible is the portion closest to the hinge portion. Hinges are generally composed of three separate pieces; two halves and a pin. The halves are joined through end pieces that are formed into two or more tubular portions, the tubular portions being staggered with gaps in between them such that when the two halves of the hinge are brought together, the gaps between the tubular portions of one half are filled with the tubular portions of the second half. With the two sides brought together, a continuous tubular portion is created through which a pin is inserted. The pin joins the two halves and serves as a pivot so that the hinge may open and close. One half of the hinge will be fastened to the door or other structure that provides an opening into a structure, and the other half fastened to the frame of the door or similar structural member so the that door may be swung open and shut. The hinge halves are secured to the door and frame using screws, bolts, or the like.

When a door is closed, the only portion of the door hinges that are visible are the tubular portions with the pins in place. In some cases the pins of the door hinges may be removed. In other cases, however, the pins are locked in place by some means and the hinge itself must be cut. To accomplish this task, a cutting device must be utilized with a rotating blade operated flush to the surface of the door in order to sever the hinge halves from the tubular structures, thereby separating the hinge halves and allowing the removal of the door.

In addition, doorway entry sometimes requires the pulling/breaking of locks. Tools and techniques are known for the removal of locks to allow entry through a locked door by rescue personnel. However, the current state of the art requires the destruction of or significant damage to doorways. The present invention provides for a lock-pulling/lock-cutting practice structure that simulates the pulling of locks with easily- and cheaply-replaced parts that nonetheless accurately simulate the real-world task of removing a lock from a door.

Forcible entry techniques also require having to cut through steel doors in order to gain access to residential and commercial buildings. In particular, steel commercial doors may require plunge-cutting in order to gain entry. Plunge-cutting is done with circular saws utilizing appropriate blades. A slit is cut in the door structure so that other tools may then be utilized to release lock mechanisms located on the other side (the interior) of the door. When practicing plunge cutting techniques, however, it is desirable to do so under conditions that are as close to real-world conditions as possible. It will be obvious that to practice this skill with actual doors would require the destruction of doors, creating significant waste in both physical resources and money.

The above tasks are skills that must be practiced. And the problems identified above in the BACKGROUND OF THE INVENTION create a need to have a structure that allows for repeated and cost-effective simulation of the above tasks. Further, the use existing doors and door structures for training in forcible entry techniques requires the use of cumbersome and awkward to transport doors and associated structures. What is needed is a combined forcible entry training device that not only provides real-world forcible entry experience for a trainee, but is also reusable and portable.

The invention herein provides that solution.

It is an object of the present invention to provide a hinge-cutting simulator for training rescuers and others the skill of cutting door or other hinges to provide access to a structure.

It is a further object of the present invention to provide a lock-pulling simulator for training rescuers and others the skill of pulling locks from doors and other structures.

It is a further object of the present invention to provide a plunge-cutting simulator for training rescuers and others the skill of plunge-cutting doors and other structures for emergency entry to buildings.

It is a further object of the present invention to provide a forcible entry training device that provides real-world conditions for training yet is reusable and cost-effective.

It is a further object of the present invention to provide a forcible entry training device that is portable and may be easily moved and positioned by a single person.

BRIEF DESCRIPTION OF THE DRAWINGS

These and other embodiments are described by the following figures and detailed description.

DETAILED DESCRIPTION OF THE INVENTION

Figure 1:
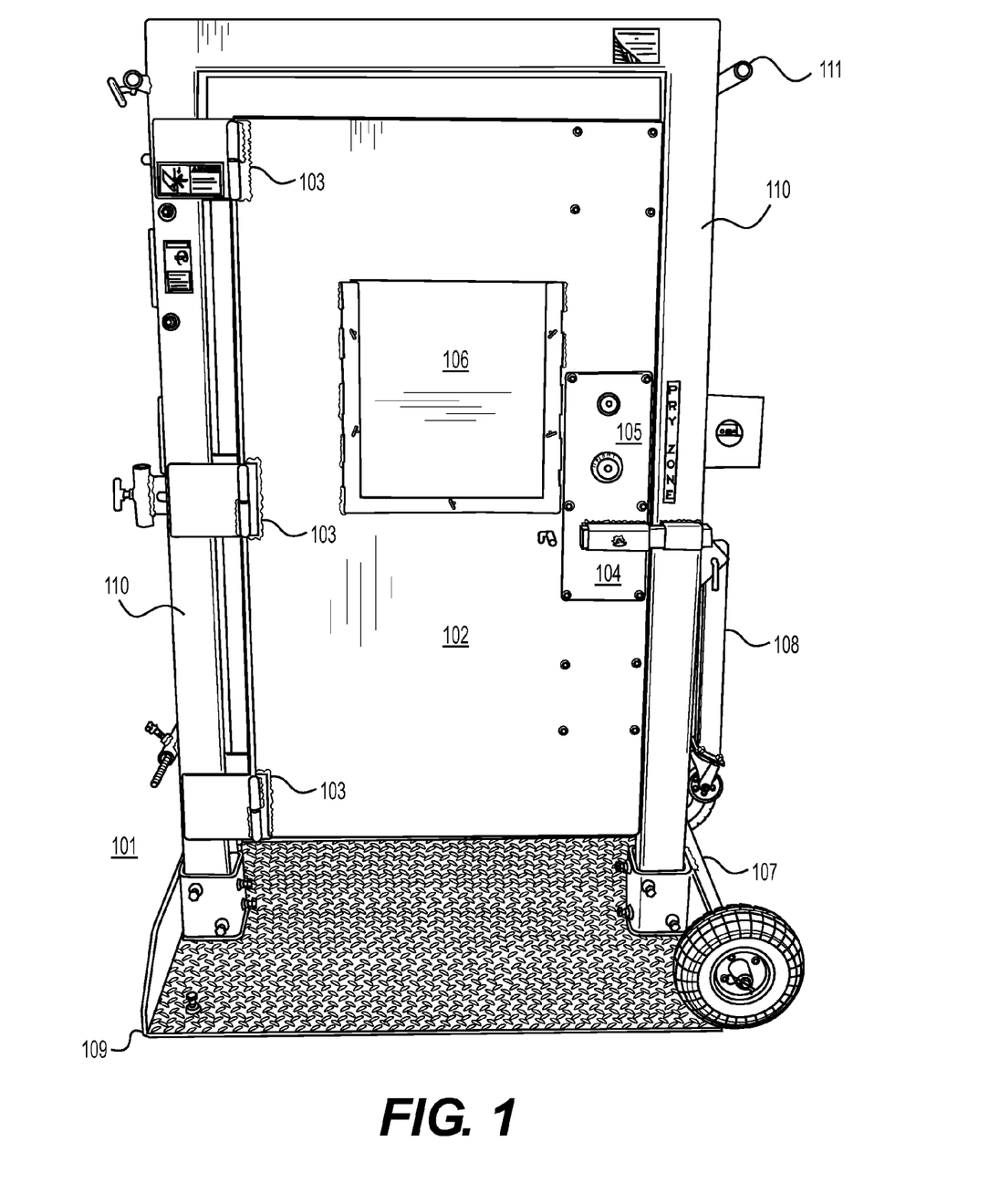
FIG. 1 is a view of the present invention showing a front view of a forcible entry training device.

Referring now to FIG. 1, an embodiment of a forcible entry training device 101 is shown. A door 102 is mounted within a frame 110 by hinges 103. Within the structure of the door 102 is a lock-pulling simulator 104, which includes a plate 105 which is mounted to the door 102. Simulated locks (FIGS. 2, 201 and 202) are position within the plate 105. A plunge cutting simulator 106 is positioned within the door 102. The frame 110 is mounted to a bottom plate 109. One end of the bottom plate 109 is affixed to an axle and wheel assembly 107. At the top end of the frame 110, distal to the axle and wheel assembly 107, is mounted a handle 111. A stabilizing wheel assembly 108 is affixed to the frame 110 above the axle and wheel assembly 107.

Figure 2:
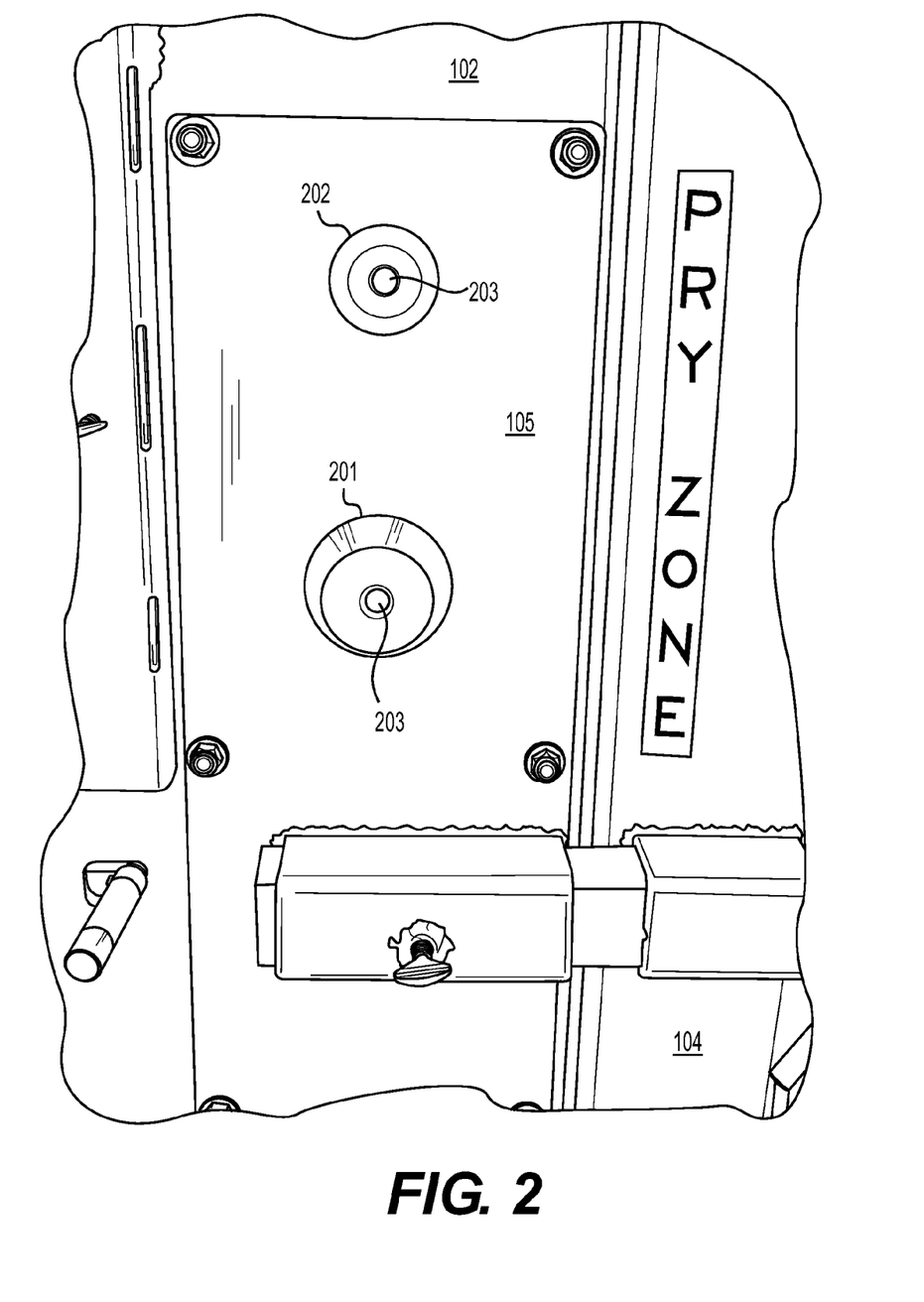
FIG. 2 is a front view of a detail of the present invention showing the lock-pulling simulator structure.

FIG. 2 shows a detail of the front of the lock-pulling simulator (FIG. 1, 104). The plate 105 is mounted to the door 102. Positioned in the plate 105 is a first simulated lock 201 and a second simulated lock 202. The first and second simulated locks are preferentially of different sizes, with the sizes corresponding to commonly used lock sizes that are likely to be encountered by emergency personnel. It will be understood that the first and second simulated locks may be of various sizes without deviating from the scope and intent of the present invention. It will also be understood that although two simulated locks are shown herein, less than or more than two simulated locks may be utilized without deviating from the scope and intent of the present invention. Each of the simulated locks is generally circular in cross-section, and simulates the physical shape of commonly used locks. The simulated locks are held in place by bolts 203 (shown in further detail in FIGS. 3 and 4).

Figure 3:
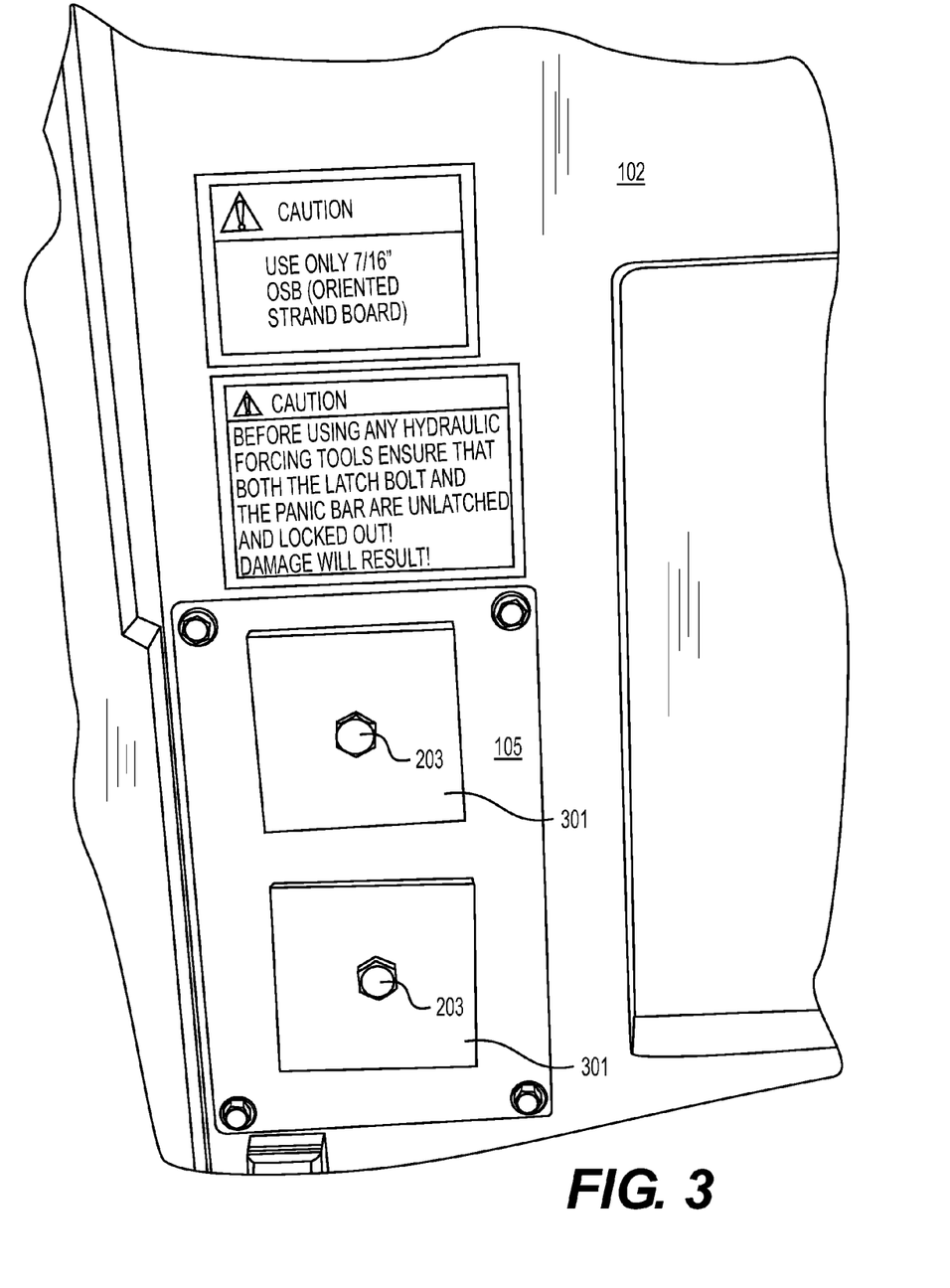
FIG. 3 is a back view of a detail of the present invention showing the lock-pulling simulator structure.

FIG. 3 shows the rear of door 102, with the rear of the plate 105. The bolts 203 holding the first and second simulated locks (FIG. 2, 201 and 202) are shown with wooden plates 301. As shown, the bolts 203 go through the center of the wooden plates 301, the wooden plates 301 restraining the bolts 203 from going through holes (FIG. 4, 401) in the plates 105.

Figure 4:
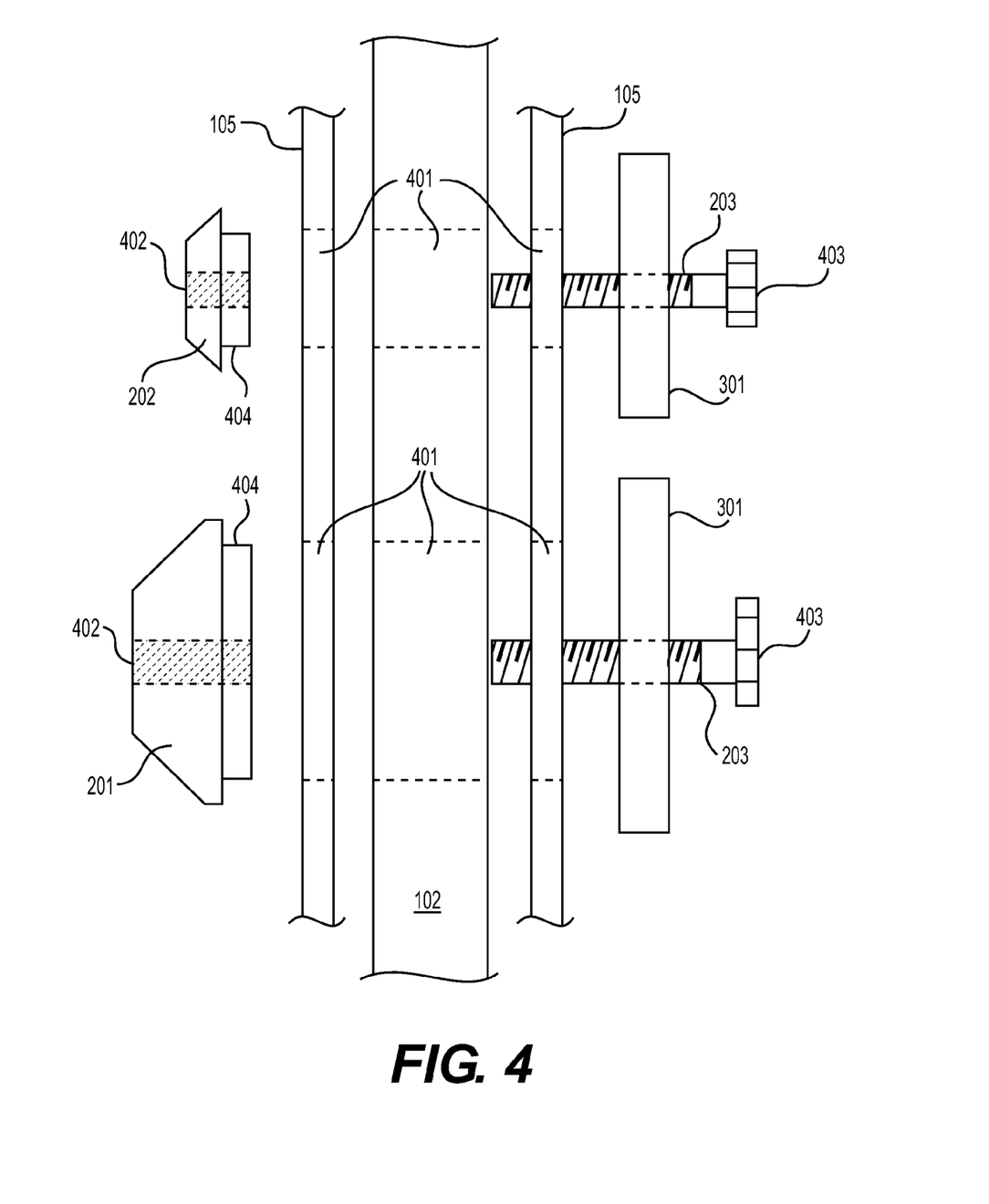
FIG. 4 is a side view of a detail of the present invention showing the lock-pulling simulator structure.

FIG. 4 shows a side view of the plate 105, with the bolts 203 passing through the wooden plates 301, the bolts 203 then passing through holes 401 in the plates 105 and the door 102, and threaded into corresponding threaded holes 402 in the simulated locks 201 and 202. The holes 401 in the plate 105 are larger than the heads 403 of the bolts 203. When assembled, the simulated locks 201 and 202 are held against the plate 105, the wooden plates 301 held against the side of the plate 105 opposite the simulated locks 201 and 202 by the heads 403 of the bolts 203. When lock-pulling devices are used on the simulated locks 201 and 202, the wooden plates 301 break, allowing the bolts 203 and the simulated locks 201 and 202 to pull through the plate 105, simulating the force necessary and the effect of pulling an actual lock under real world conditions. After each use, the wooden plates 301 are replaced with new wooden plates 301, while the bolts 203 and the simulated locks 201 and 202 may be reused numerous times. The simulated locks 201 and 202 have collars 404 which are the same diameter as the holes 401.

Figure 5:
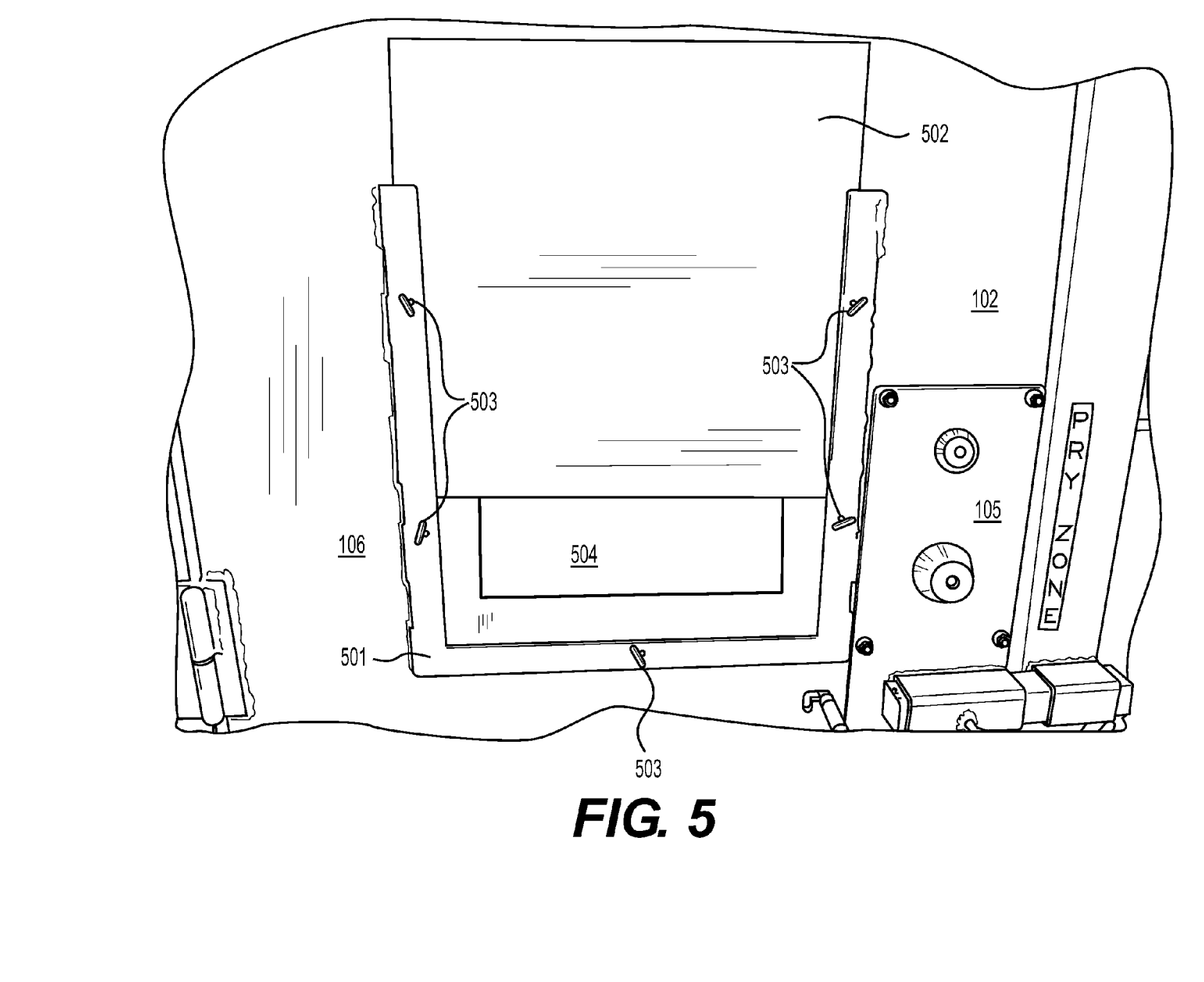
FIG. 5 is a front view of a detail of the present invention showing the plunge-cutting simulator.
Figure 6:
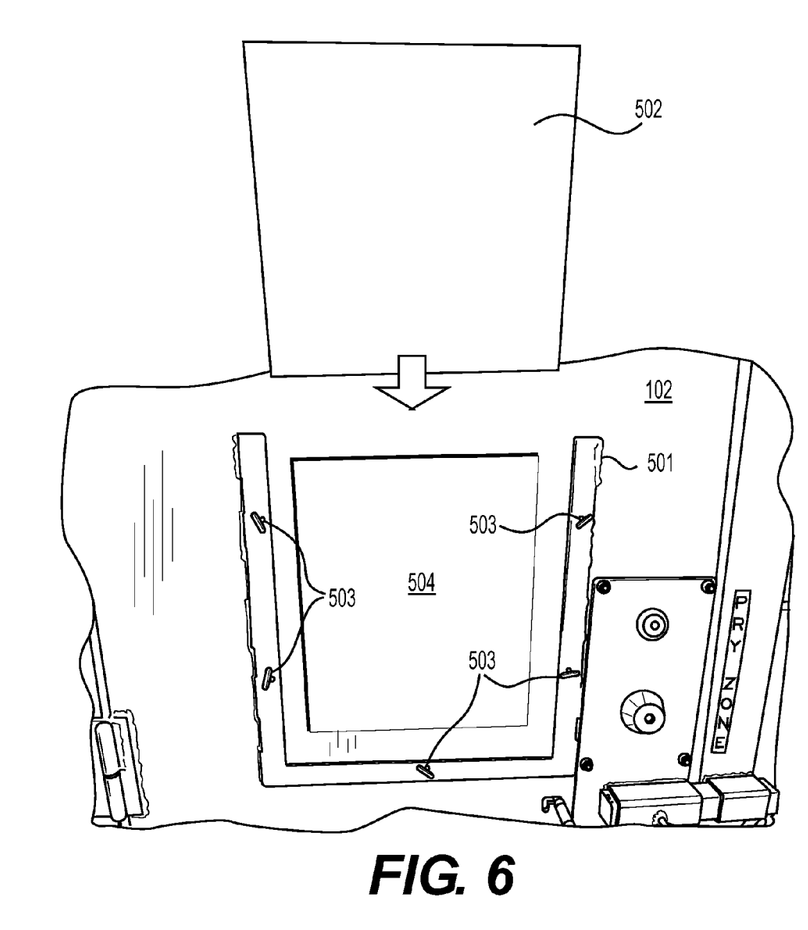
FIG. 6 is a front view of a detail of the present invention showing the plunge-cutting simulator.

FIG. 5 shows a detail of the door 102 with the plunge cutting simulator 106. A frame 501 is mounted to the door 102, with a bottom and two side edges that frame an opening 504 in the door 102. A metal plate 502 slides into position between the frame 501 and the door 102; the metal plate 502 is held in place by thumb screws 503. It will be understood that, although the metal plate 502 is only shown partially inserted into the frame 501, while in use the metal plate 502 will be inserted fully into the frame 501 so as to fully cover the opening 504 (as shown in FIG. 1, 106). FIG. 6 shows the metal plate 502 fully removed from the frame 501. While the device as described herein utilizes a metal plate 502, it will be understood that other materials may be utilized without deviating from the scope and intent of the present invention. The metal plate 502 may be utilized for numerous training cycles before requiring replacement.

Figure 7:
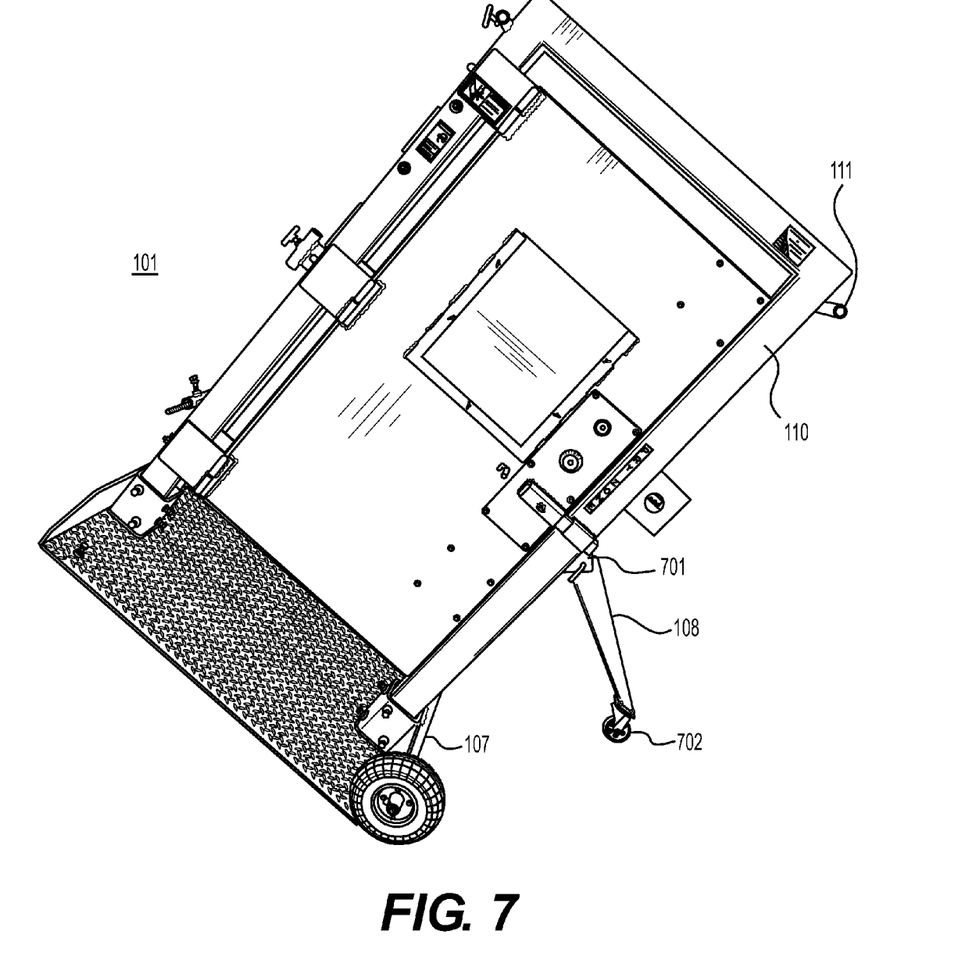
FIG. 7 is a view of the present invention showing a view of a forcible entry training device in position for transport with a stabilizing wheel extended.
Figure 8:
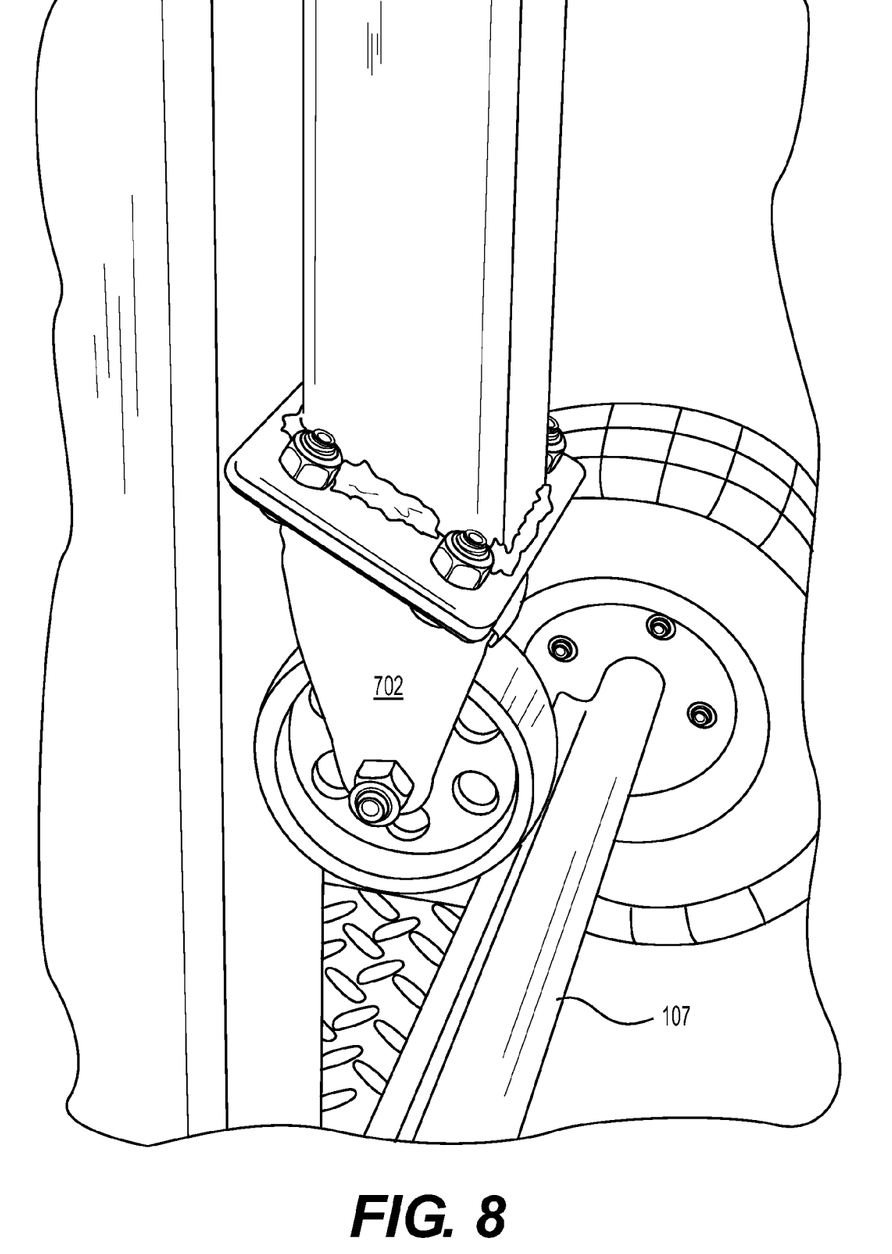
FIG. 8 is a detail view of a stabilizing wheel assembly.
Figure 9:
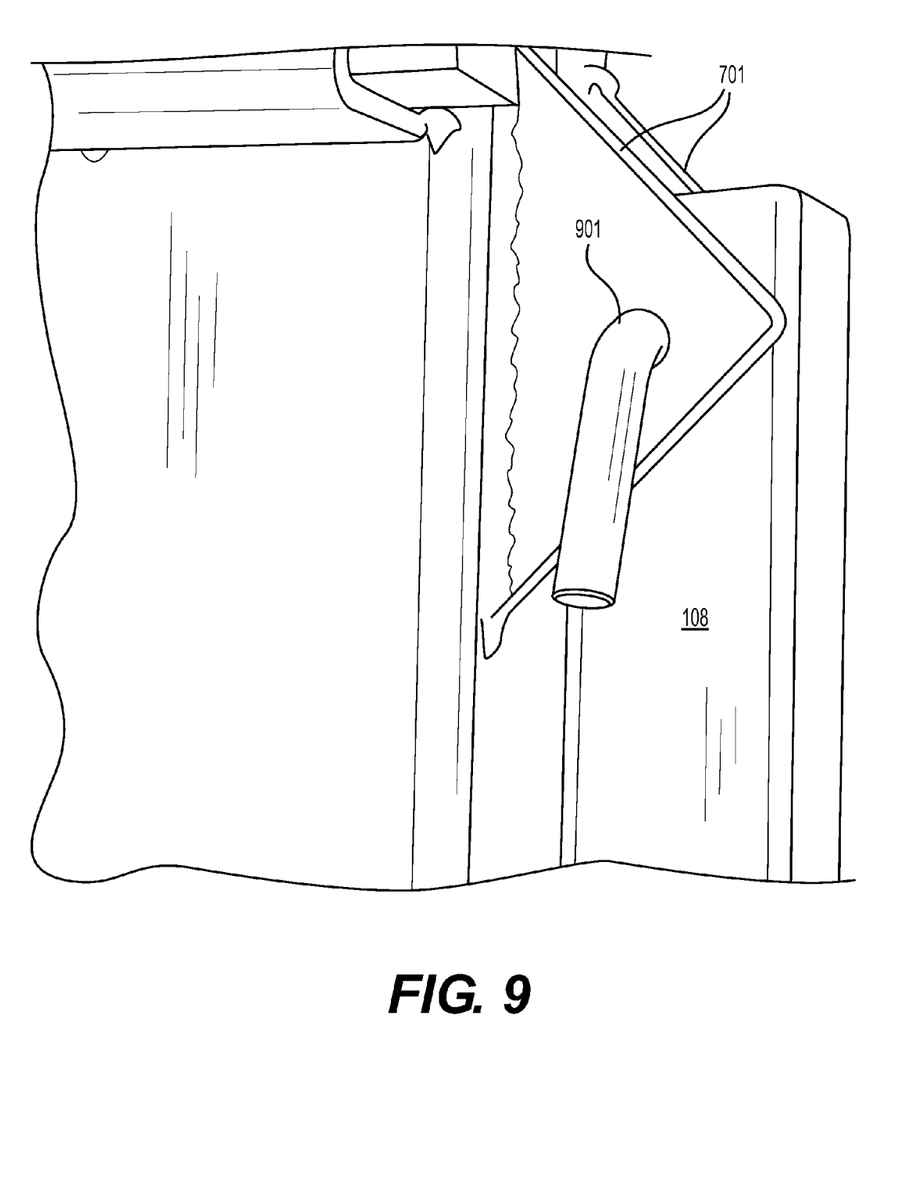
FIG. 9 is a detail view of a bracket connector for a stabilizing wheel assembly.

FIG. 7 shows the present invention with the stabilizing wheel assembly 108 extended outward in the transport position, with the stabilizing wheel assembly 108 hingedly attached with a bracket 701 to the frame 110. The stabilizing wheel assembly 108 has a wheel 702 attached at the end of the assembly 108 so that when the device 101 is rotated over the axle and wheel assembly 107, the wheel 702 may be placed upon the ground for easy transport and maneuvering utilizing the axle and wheel assembly 107, the wheel 702 on the stabilizing wheel assembly 108, and the handle 111. FIG. 8 shows a detail of the wheel 702, and FIG. 9 shows a detail of a bracket 701 wherein the stabilizing wheel assembly 108 is hingedly attached via means of a pin 901 through the bracket 701 and the stabilizing wheel assembly 108.

Figure 10:
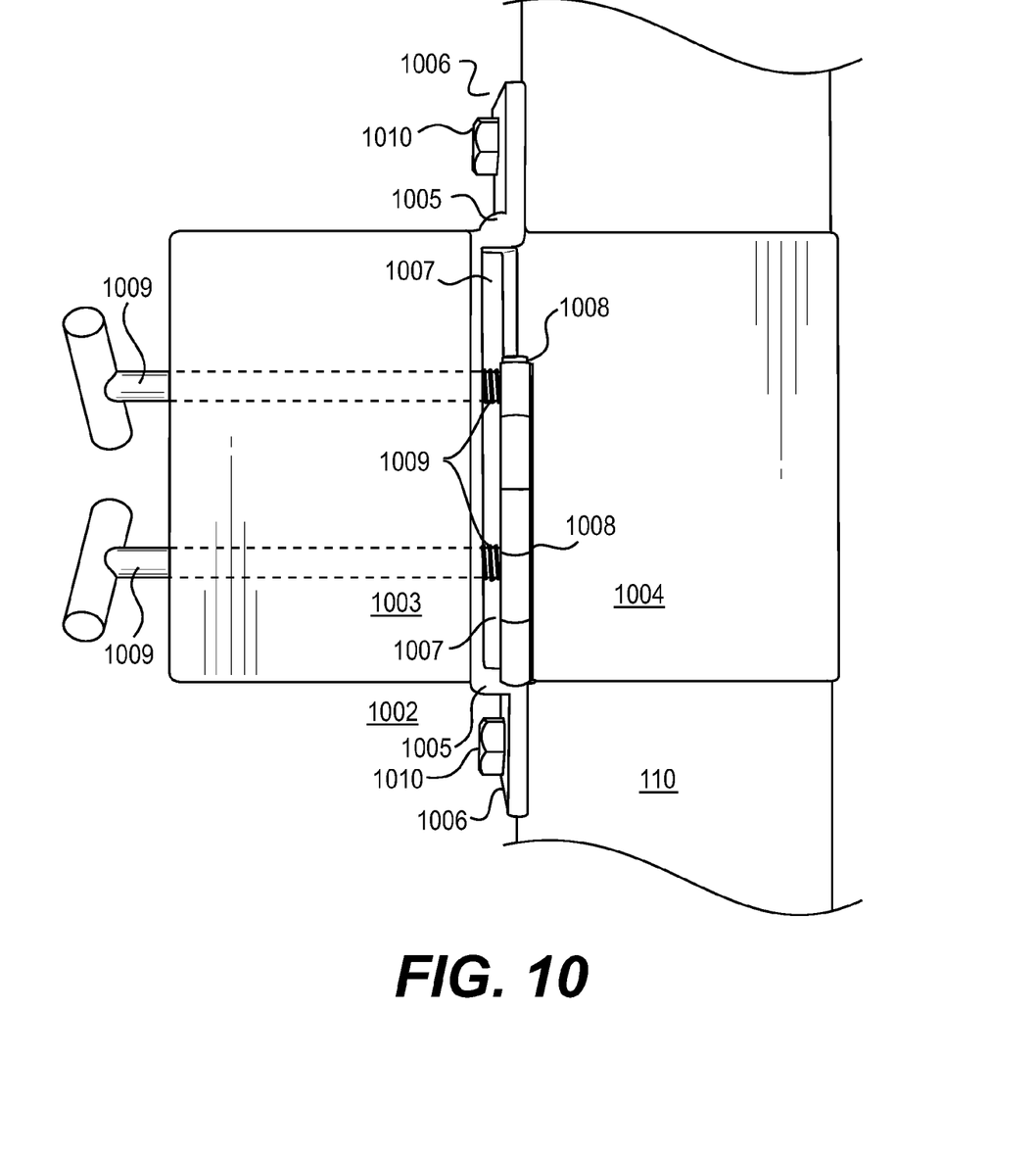
FIG. 10 is a view of the present invention showing a top-down view of a hinge mounted in the device.
Figure 11:
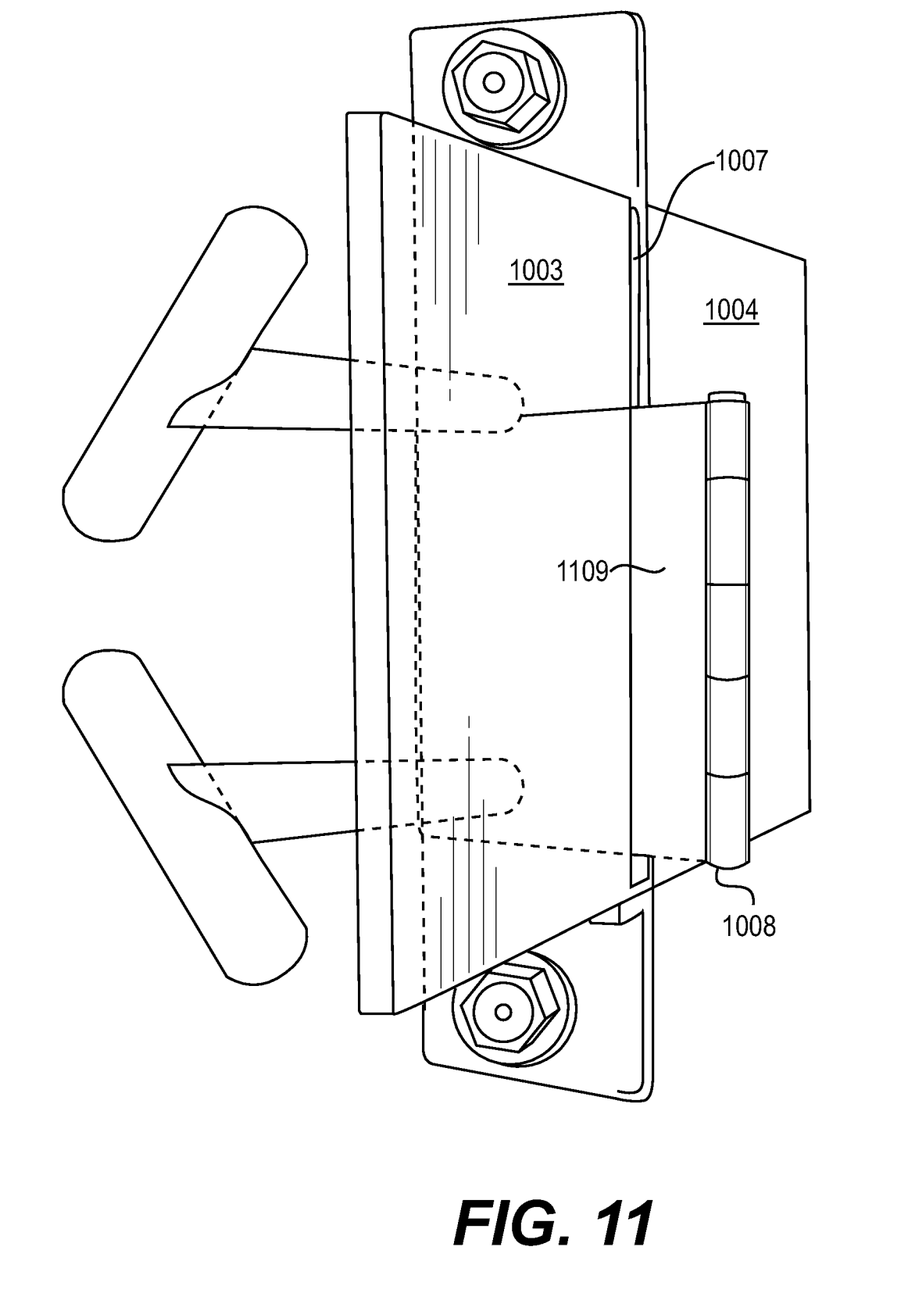
FIG. 11 is a three-quarters view of the present invention showing a hinge mounted in the device.
Figure 12:
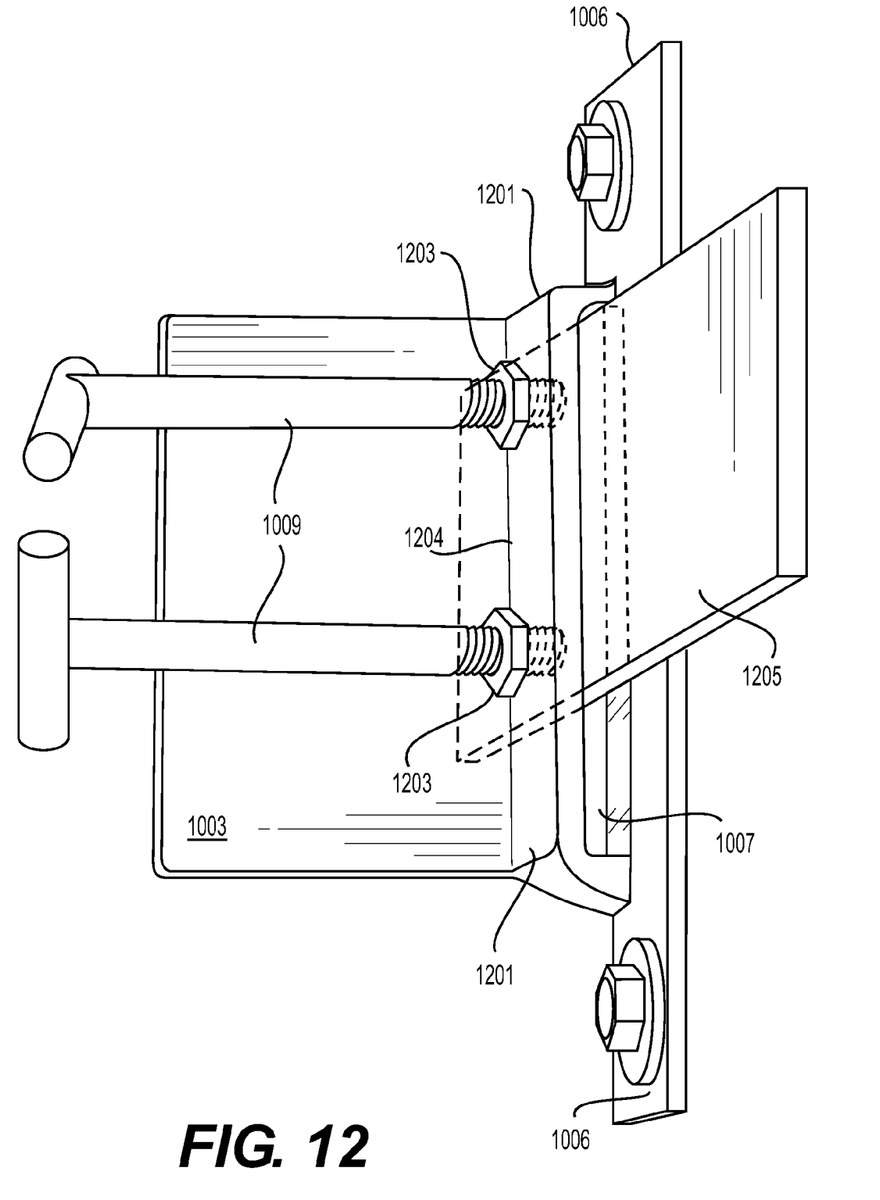
FIG. 12 is a rear view of the present invention.

A hinge cutting simulator is shown in FIGS. 10-12.

FIG. 10 shows a hinge 1008 shown mounted to the frame 110 in the clamping space 1007 with set screws 1009, the set screws 1009 extending behind the first portion 1003, the set screws 1009 threaded through the top of the clamping portion (FIG. 12, 1201), causing the hinge 1008 to be firmly held within the clamping space 1007.

Referring now to FIG. 11, an embodiment of the present invention is shown in three-quarter view with the cutting face comprised of the first portion 1003 and the second portion 1004 shown. The hinge 1008 is shown clamped within the clamping space 1007 such that a portion of the flat sides 1109 of the hinge 1008 is extended beyond the cutting face, allowing for a training exercise in cutting the hinge 1008 in the same manner as would be required for forcible entry into a building.

Referring now to FIG. 12, the back or rear portion (facing away from cutting surface) is shown. Extending from the base of the back of the first portion 1003 is the clamping portion 1201. The top part 1204 of the clamping portion 1201 is generally flat, and parallel to the mounting portion 1006. The form of the top part 1204 of the clamping portion 1201 with the mounting portion 1006 creates the mounting space 1007. It will be understood that the configuration may be of varying sizes to provide various lengths, widths, and depths to the mounting space 1007 so as to accommodate various ranges of hinge or cutting material sizes. Shown in FIG. 12 is a plate 1205 of stock metal, chosen to be similar in size and properties to hinge material. The plate 1205, when the simulator is used for training, will be chosen of a size that is similar in width and depth to the hinge size being simulated, and of a length such that multiple cuts may be made on the plate 1205, which is advanced through the clamping space 1007 prior to each training exercise. By utilizing plate metal and allowing a length of plate to be fed through the simulator as desired, the simulator eliminates the need to continually buy and destroy hinges that are significantly more expensive, per cut, than using this simulator with plate metal in the manner described herein.

The set screws 1009 are threaded, and extend through threaded portions 1203 in the top part 1204 of the clamping portion 1201. As the set screws 1009 are screwed into the clamping portion 1201, they press against the plate 1205 (or, in the case of a hinge as shown in FIGS. 10 and 11, against the flat portion of the hinge), locking it in place against the opposite side of the mounting space 1007, thereby locking the plate in place and allowing the training exercise to take place.

These embodiments have been described in sufficient detail to enable those skilled in the art to practice them, and it is to be understood that changes may be made without deviating from the scope of the invention described herein.

What is claimed is:

1. A forcible entry training device comprising:
   a bottom plate;
   a frame mounted to the bottom plate;
   a door mounted within the frame with hinges attached to the door and the frame, the door having openings to accommodate one or more lock-pulling simulators and one or more plunge cutting simulators;
   a lock-pulling simulator mounted within the door;
   a plunge cutting simulator mounted within the door;
   an axle and wheel assembly mounted to the bottom plate; and
   a stabilizing wheel assembly mounted to the outside of the frame above the axle and wheel assembly, the stabilizing wheel assembly hingedly attached to the frame with a bracket and pin, the pin extending through the bracket and the stabilizing wheel assembly.

2. The forcible entry training device of claim 1 further comprising a handle attached to the frame above the stabilizing wheel assembly.

3. The forcible entry training device of claim 1 wherein the lock pulling simulator comprises:
   one or more simulated door locks that are generally circular in cross-section, with the simulated locks having collars and threaded holes;
   two plates having circular holes that are the same diameter as the collars of the simulated locks and the plates being positioned on either side of the door;
   a wooden plate positioned on the side of the door opposite the side on which the one or more simulated locks are positioned, the wooden plate being of a size larger than the circular hole in the plate, and the wooden plate further comprising a hole of a diameter sufficient to pass through a bolt but which will not pass the head of the bolt, the bolt being chosen to thread into the threaded holes in the one or more simulated locks.

4. The forcible entry training device of claim 1 wherein the plunge cutting simulator comprises a frame mounted to the door, the frame having a bottom and two side edges and framing an opening in the door that is of a size smaller than the frame, the frame further comprising thumb screws inserted through the bottom and two side edges; and a plate inserted between the door and the frame.

5. The forcible entry training device of claim 1, further comprising a hinge cutting simulator, the hinge cutting simulator comprising a clamping space mounted to the frame, set screws threaded through the clamping space, and a hinge clamped in place in the clamping space by the set screws.

6. A forcible entry training device comprising:
   a bottom plate;
   a frame mounted to the bottom plate;
   a door mounted within the frame with hinges attached to the door and the frame, the door having openings to accommodate one or more lock-pulling simulators;
   a lock-pulling simulator mounted within the door, comprising one or more simulated door locks that are generally circular in cross-section, with the simulated locks having collars and threaded holes, two plates having circular holes that are the same diameter as the collars of the simulated locks and the plates being positioned on either side of the door, a wooden plate positioned on the side of the door opposite the side on which the one or more simulated locks are positioned, the wooden plate being of a size larger than the circular hole in the plate, and the wooden plate further comprising a hole of a diameter sufficient to pass through a bolt but which will not pass the head of the bolt, the bolt being chosen to thread into the threaded holes in the one or more simulated locks.

7. The forcible entry training device of claim 6, further comprising
a plunge cutting simulator mounted within the door wherein the plunge cutting simulator comprises a frame mounted to the door, the frame having a bottom and two side edges and framing an opening in the door that is of a size smaller than the frame, the frame further comprising thumb screws inserted through the bottom and two side edges; and a plate inserted between the door and the frame; and
a hinge cutting simulator, the hinge cutting simulator comprising a clamping space mounted to the frame, set screws threaded through the clamping space, and a hinge clamped in place in the clamping space by the set screws.

8. The forcible entry training device of claim 6 further comprising an axle and wheel assembly mounted to the bottom plate; a stabilizing wheel assembly mounted to the outside of the frame above the axle and wheel assembly, the stabilizing wheel assembly hingedly attached to the frame with a bracket and pin, the pin extending through the bracket and the stabilizing wheel assembly; and a handle attached to the frame above the stabilizing wheel assembly.

9. A forcible entry training device comprising:
a bottom plate;
a frame mounted to the bottom plate;
a door mounted within the frame with hinges attached to the door and the frame, the door having openings to accommodate one or more lock-pulling simulators and one or more plunge cutting simulators;
a plunge cutting simulator mounted within the door wherein the plunge cutting simulator comprises a frame mounted to the door, the frame having a bottom and two side edges and framing an opening in the door that is of a size smaller than the frame, the frame further comprising thumb screws inserted through the bottom and two side edges; and a plate inserted between the door and the frame;
a hinge cutting simulator, the hinge cutting simulator comprising a clamping space mounted to the frame, set screws threaded through the clamping space, and a hinge clamped in place in the clamping space by the set screws; a lock-pulling simulator mounted within the door, comprising one or more simulated door locks that are generally circular in cross-section, with the simulated locks having collars and threaded holes, two plates having circular holes that are the same diameter as the collars of the simulated locks and the plates being positioned on either side of the door, a wooden plate positioned on the side of the door opposite the side on which the one or more simulated locks are positioned, the wooden plate being of a size larger than the circular hole in the plate, and the wooden plate further comprising a hole of a diameter sufficient to pass through a bolt but which will not pass the head of the bolt, the bolt being chosen to thread into the threaded holes in the one or more simulated locks;
an axle and wheel assembly mounted to the bottom plate; and a stabilizing wheel assembly mounted to the outside of the frame above the axle and wheel assembly, the stabilizing wheel assembly hingedly attached to the frame with a bracket and pin, the pin extending through the bracket and the stabilizing wheel assembly; and a handle attached to the frame above the stabilizing wheel assembly.

\* \* \* \* \*